US 6,646,778 B2

(12) United States Patent
Gudeman et al.

(10) Patent No.: US 6,646,778 B2
(45) Date of Patent: Nov. 11, 2003

(54) GRATING LIGHT VALVE WITH ENCAPSULATED DAMPENING GAS

(75) Inventors: Chris Gudeman, Los Gatos, CA (US); James Gill Shook, Santa Cruz, CA (US)

(73) Assignee: Silicon Light Machines, Sunnyvale, CA (US)

( * ) Notice: Subject to any disclaimer, the term of this patent is extended or adjusted under 35 U.S.C. 154(b) by 289 days.

(21) Appl. No.: 09/921,266

(22) Filed: Aug. 1, 2001

(65) Prior Publication Data

US 2003/0025984 A1 Feb. 6, 2003

(51) Int. Cl.[7] .............................................. G02B 26/00
(52) U.S. Cl. ..................... 359/291; 359/572; 359/573; 359/231
(58) Field of Search ................. 359/290, 291, 359/292, 293, 295, 230, 231, 223, 224, 566, 572, 573

(56) References Cited

U.S. PATENT DOCUMENTS

| 3,693,239 | A | | 9/1972 | Dix .............................. 29/470 |
| 5,126,826 | A | | 6/1992 | Kauchi et al. ................. 357/72 |
| 5,188,280 | A | | 2/1993 | Nakao et al. ................. 228/123 |
| 5,311,360 | A | | 5/1994 | Bloom et al. ................. 359/572 |
| 5,323,051 | A | | 6/1994 | Adams et al. ............... 257/417 |
| 5,331,454 | A | | 7/1994 | Hornbeck .................... 359/224 |
| 5,482,564 | A | | 1/1996 | Douglas et al. ............... 134/18 |
| 5,602,671 | A | | 2/1997 | Hornbeck .................... 359/224 |
| 5,610,438 | A | | 3/1997 | Wallace et al. ............. 257/682 |
| 5,757,536 | A | | 5/1998 | Ricco et al. ................. 359/224 |
| 5,808,797 | A | | 9/1998 | Bloom et al. ................. 359/572 |
| 5,837,562 | A | | 11/1998 | Cho .............................. 438/51 |
| 5,841,579 | A | | 11/1998 | Bloom et al. ................. 359/572 |
| 5,895,233 | A | | 4/1999 | Higashi et al. ............. 438/107 |
| 6,004,912 | A | | 12/1999 | Gudeman .................... 508/577 |
| 6,195,196 | B1 | * | 2/2001 | Kimura et al. ............... 359/619 |
| 6,303,986 | B1 | * | 10/2001 | Shook ......................... 257/680 |
| 6,384,959 | B1 | * | 5/2002 | Furlani et al. ............... 359/291 |

FOREIGN PATENT DOCUMENTS

| DE | 43 23 799 A1 | 1/1994 | ........... H01L/23/50 |
| WO | WO 98/05935 | 2/1998 | ............. G01L/9/06 |
| WO | WO 99/67671 | 12/1999 | ........... G02B/26/08 |
| WO | WO 00/07225 | 2/2000 | ........... H01L/21/00 |

OTHER PUBLICATIONS

Johannes Buhler et al., "Linear array of complementary metal oxide semiconductor double–pass metal micromirrors," 1997 Society of Photo–Optical Instrumentation Engineers, pp. 1391–1398.

E. M. Russick et al., "Supercritical Carbon Dioxide Extraction of Solvent from Micromachined Structures," 1997 American Chemical Society, Chapter 18, pp. 255–269.

"Development of Digital MEMS–Based Display Technology Promises Improved Resolution, Contrast, And Speed", XP–000730009, 1997, p. 33 of 34.

* cited by examiner

Primary Examiner—Hung Xuan Dang
Assistant Examiner—Tuyen Tra
(74) Attorney, Agent, or Firm—Haverstock & Owens LLP

(57) ABSTRACT

An optical MEM device is encapsulated with a dampening gas to reduce oscillatory vibrations of movable parts during the operation of the device. Preferably, the dampening gas comprises one or more noble gases, such as neon and/or krypton with a partial pressure in a range of 50 to 100% of the total dampening gas pressure. In further embodiments, the dampening gas comprises a mixture of one or more noble gases and an inert carrier gas, such as nitrogen. Preferably, the optical MEM device is sealed within a die with a dampening gas pressure between 0.5 to 3.0 atmospheres at 20 degree Celsius. The current invention is particularly useful for reducing oscillatory vibrations of optical MEM devices having a plurality of movable ribbon structures configured to modulate light with one or more wavelengths in the near infrared (800 to 4000 nanometers) and which operate at high switching rates (4–40 Volts/nano second) and at high switching frequencies (1 kHz and greater).

25 Claims, 8 Drawing Sheets

US 6,646,778 B2

GRATING LIGHT VALVE WITH ENCAPSULATED DAMPENING GAS

FIELD OF THE INVENTION

The invention relates to an optical MEM device with movable ribbons for modulating light. More particularly, the present invention relates to an optical MEM device encapsulated within a dampening gas environment to reduce vibrations of the movable ribbons during operation.

BACKGROUND OF THE INVENTION

Optical MEM (micro-electro-mechanical) device have applications in display, print, optical and electrical technologies. One type of an optical MEM device is a grating light valve that is capable of modulating light by constructive and destructive interference of an incident light source. Exemplary grating light valves and methods for making grating light valves are disclosed in the U.S. Pat. Nos. 5,311,360, 5,841,579 and 5,808,797, issued to Bloom et al., the contents of which are hereby incorporated by reference.

SUMMARY OF THE INVENTION

Grating light valves of the instant invention generate the condition for constructive and destructive interference through a plurality of movable ribbons. The movable ribbons provide a first set of reflective surfaces that are movable relative to a second set of reflective surfaces. The second set of reflective surfaces are reflective surfaces on a substrate element or on a second set of ribbons. In operation, an incident light source having a wavelength $\lambda$ impinges on the first set of reflective surfaces and the second set of reflective surfaces. The movable ribbons are displaced towards or away from the second set of reflective surfaces by $\lambda/4$, or a multiple thereof. The portion of light that is reflected from the first set of reflective surfaces and the portion of light that is reflected from the second set of reflective surfaces alternate between being in phase and being out of phase. Preferably, the first set of reflective surfaces and the second set of reflective surfaces are either in the same reflective plane or are separated $\lambda/2$ for generating the condition for constructive interference.

FIG. 1a illustrates a grating light valve with plurality of movable ribbons 100 that are formed in a spatial relationship over a substrate 102. Both the ribbons 100 and the regions of the substrate between the ribbons have reflective surfaces 104 and 106. The reflective surfaces 104 and 106 are provided by coating the ribbons 100 and the substrate with a reflective material, such as an aluminum or silver. The height difference 103 between the reflective surfaces 104 and 106 on the ribbons 100 and the substrate 102 is $n\lambda/2$ (where n is a whole number). When light having a wavelength $\lambda$ impinges on the complement of reflective surfaces 104 and 106, the portion of light reflected from the surfaces 104 of the ribbons 100 will be in phase with the portion of light reflected from the surfaces 106 of the substrate 102. This is because the portion of light which strikes the surfaces 104 of the substrate 102 will travel a distance $\lambda/2$ farther than the portion of light striking the surfaces 104 of the ribbons 100. Returning, the portion of light that is reflected from the surfaces 104 of the substrate 102 will travel an additional distance $\lambda/2$ farther than the portion of light striking the surface 106 of the ribbons 100, thus allowing the complement of reflective surfaces 104 to act as a mirror.

Referring to FIG. 1b, in operation the ribbons 100 are displaced toward the substrate 102 by a distance 105 that is equal to $\lambda/4$ or $\lambda/4$ plus $n\lambda/2$ (where n is a whole number) in order to switch from the conditions for constructive interference to the conditions for destructive interference. When light having a wavelength $\lambda$ impinges on the reflective surfaces 104' and 106 with the ribbons 100' in the down position, the portion of light reflected from the surfaces 104' will be out of phase, or partially out of phase, with the portion of light reflected from the surfaces 106 and some or all of the light will be diffracted. By alternating the ribbon between the positions shown in FIG. 1a and FIG. 1b, the light is modulated.

An alternative construction for a grating light valve is illustrated in the FIGS. 2a–b. Referring to FIG. 2a, the grating light valve has a plurality of ribbons 206 and 207 that are suspended by a distance 203 over a substrate element 202. The ribbons 206 and 207 are provided with reflective surfaces 204 and 205, respectively. The surface 208 of the substrate 202 may also be reflective. The first set of ribbons 206 and the second set of ribbons 207 are initially in the same reflective plane in the absence of an applied force. Preferably, the first set of ribbons 206 and the second set of ribbons 207 are suspended over the substrate by a distance 203 such that the distances 209 between the reflective surfaces 205 and 205 of the ribbons 206 and 207 and the reflective surface 208 of the substrate 202 corresponding to n $\lambda/2$. Accordingly, the portions of light reflected from the surfaces 204 and 205 of the ribbons 206 and 207 and the reflective surface 208 of the substrate 202 with a wavelength $\lambda$ will all be in phase. The ribbons 206 and 207 are capable of being displaced relative to each other by a distance corresponding to a multiple of $\lambda/4$ and thus switching between the conditions for constructive and destructive interference with an incident light source having a wavelength $\lambda$.

In the FIG. 2b, the second set of ribbons 207 is displaced by a distance 203, corresponding to a multiple of $\lambda/4$ of to the position 207'. The portion of the light reflected from the surfaces 205' of the ribbons 207 will destructively interfere with the portion of the light reflected from the surfaces 204 of the ribbons 206. While the FIG. 1b and FIG. 2b show ribbons touching the surface of the substrate, the instant invention is particularly useful in grating light valve designs where movable ribbons do not contact the substrate surface or where movable ribbons only partially contact the surface of the substrate. Accordingly, FIGS. 1a–b and FIGS. 2a–b are for illustrative purposes only and are not intended to limit the scope of the invention. Further, it is understood that the current invention is not limited to grating light valves and has applications for reducing vibrational oscillations in other micro machine devices with or without reflective surfaces.

FIG. 3 plots an idealized brightness response 107 of a grating light valve to an incident light source with a wavelength $\lambda$ when voltage 108 is applied across a selected set ribbons (active ribbons) and the underlying substrate of the grating light valve to alternate between the conditions for constructive and destructive interference. From the discussion above, the brightness will be at a maximum 111 when the ribbons are in the same reflective plane or separated by $\lambda/2$, or a multiple of $\lambda/2$, and the brightness will be at a minimum 111 when the ribbons are separated by $\lambda/4$, or $\lambda/4$ plus $(n)\lambda/2$. Specifically, to operate the grating light valve, a voltage $V_1$ is applied across the active ribbons and the underlying substrate. At this point the active ribbons are in the constructive interference position and the maximum brightness 109 is observed. As the voltage is increased to $V_2$, the active ribbons are moved to a destructive interference position and the minimum brightness 109 is observed. As the voltage is reduced, the active ribbons do return to their constructive interference position when $V_1$ is reached.

The rate (Volt/sec) at which voltage is applied to switch the ribbons of the grating light valve between the conditions for constructive and destructive interference is referred to as the switching rate, and is typically in the range of 4000 to 0.4 Volt/nano seconds. The frequency of at which the grating light valve is switched between the conditions for constructive and destructive interference is referred to as the switching frequency and is typically in the range of 100 KHz to 20 MHz.

Whether a grating light is constructed according to the principles illustrated in FIGS. 1a–b, FIGS. 2a–b, or any other construction including constructions where movable ribbons do not touch the surface of the substrate, there is the tendency for the ribbons to exhibit oscillatory vibrations when they are moved from one position to another.

In applications where the light source used has wavelengths $\lambda$ corresponding to the near infrared (ca. 800–4000 nanometers), the distances that the ribbons are displaced to alternate between the constructive and destructive interference positions are between 200 to 1000 nanometers or greater. With greater displacement distances, the ribbons tend to exhibit oscillatory vibrations with greater amplitudes. These oscillatory vibrations reduce the ability of the device to effectively act as a light valve for light sources in the near infrared.

Many print applications utilize light sources that operate with wavelengths corresponding to the near infrared and the visible region of the spectrum. Because the oscillatory vibrations are a significant limitation for grating light valves operating at these wavelengths, grating light valves have had limited use in print applications. Further, the oscillatory vibrations reduce ability to operate under conditions of high switching voltages and high switching frequencies that are desirable for high speed print applications.

What is needed is a grating light valve that exhibits reduced oscillatory vibrations of reflective ribbons. Further, what is needed is a grating light valve that modulates light with minimized oscillatory vibrations at wavelengths in the near infrared for print applications.

According to the present invention the movable ribbons of a grating valves are sealed within a die structure along with a dampening gas environment. The damping gas preferably has a pressure of between 0.5 and 3.0 atmospheres within the die and more preferably between 0.5 and 1.5 atmospheres at 20 degrees Celsius. The dampening gas environment comprises an inert gas or noble group VIII gas including He, Ne, Ar, Kr, Xe, Rn or a mixture thereof. Preferably, the inert gas is 50 more molar percent of the total dampening gas.

The grating light valve comprises a plurality of spatially arranged elongated ribbons with a reflective surface and a substrate element with reflective regions between the ribbons. The grating light valve modulates light by constructive and destructive interference of the reflected light at an incident wavelength $\lambda$ when the ribbons, or a portion thereof, are moved by a predetermined distance. The ribbons are moved to switch between a destructive interference position and a constructive interference position by applying the appropriate switching voltages across selected ribbons and the substrate.

The dampening gas environment attenuates oscillatory vibrations or "ringing" that results from the displacement of the ribbons while alternating between the destructive interference position and the constructive interference position. The current invention is particularly useful for grating light valves operating at wavelengths $\lambda$ corresponding to the near infrared (800 to 4000 nm) and where the ribbons are required to move a distance equal to a multiple of $\lambda/4$. The current invention is also particularly useful for grating light valves that operate at high switching rates (4–40 Volts/nano second) and at high switching frequencies (1 kHz and greater).

In accordance with the instant invention, grating light valves are arranged in an array and configured to activate a print medium. The array has a plurality of independently operable grating light valves that are used to activate a pixel or spot in the print medium. The surface of the array is illuminated with a light source, such as a laser source or any other light source suitable for the application at hand. The print medium and the array are moved relative to each other and individual grating light valves or sets of grating light valves are actuated, thereby exposing the medium with the desired image or latent image. The array device and/or the imaging process may also utilize a suitable optical arrangement, including lenses and mirrors positioned between the light source and the array or between the array and the print medium in order to facilitate the imaging process.

The print medium is any print medium that is capable of being activated by the light source used. For example, the print medium is paper that is photo activated with a charge image, which subsequently collects a curable toner to produce an image. Alternatively, the system is configured to activate a developable latent image such as a silver halide-based medium.

The dampening gas environment is preferably sealed within the die structure by providing a metallized gasket on a sealing edge of the die structure. A glass cap is provided with a complementary metallized gasket. The glass cap is placed on the sealing edge of the die and the gaskets are aligned to overlap with a solder material between. The temperature of the die and the glass cap are adjusted and the pressure of the dampening gas environment within the cavity of the die is adjusted. The cap and the die structure are soldered together by virtue of the elevated temperature through the metallized gaskets and the solder material which form a hermetic seal and trap the damping gas environment within the die structure. The total pressure of the damping gas environment within the sealed die structure is preferably in the range of 0.5 to 3.0 atmospheres and most preferably in the range of 0.5 to 1.5 atmospheres.

Referring to FIGS. 9 and 10, a first metallized gasket 550 is formed around a portion of, or a lip portion of, the die structure 501 defining an inner sealing region. A second and complimentary metallized gasket 556 is formed on the lid 558. A grating light valve 500, which is either formed integral with the die 501, or provided separately from the die 501, is positioned within the inner sealing region on the die 501. A solder material 560 is placed between the metallized gaskets 550 and 556 and the temperature is adjusted to a sufficient degree to cause the solder material 560' to flow and seal the lid 558 to the die 501 through the metallized gaskets 550 and 556. Alternatively, the lid 558 and the die 501 are sealed together using an epoxy material or other adhesive material.

According to a preferred embodiment, the metallized gaskets 556 and 550 are formed from first layers of chromium that are deposited on the lid 558 and the die structure 501 to a thickness of approximately 300 angstroms. A second layers of gold is then deposited on each of the first layer of chromium to a thickness of approximately 10,000 angstroms. It is also preferable, that the solder material 560 is an 80 Au/20 Sn solder that is approximately 50 microns thick. Other details and embodiments are described in U.S. patent application Ser. No. 09/124,710, the content of which is hereby incorporated by reference. The primary function of the metallized gaskets 550 and 556 in the instant invention is to provide a compatible interface between the lid 558 and the solder material 560 and between the die structure 501 and the solder material 560, such that a hermetic seal is achieved.

The step of sealing the ribbon in the dampening gas environment is preferably performed in a isolation chamber where the temperature of the die structure and glass cap are adjusted to approximately 300 Celsius for a sufficient period of time to form the seal as described above. During the formation of the seal or prior to the formation of the seal, the pressure of the dampening gas environment is adjusted to between 1.0 to 6.0 atmospheres, such that the resultant grating light valve device after cooling has a encapsulated dampening gas environment with a pressure that is approximately between 0.5 to 3.0 atmospheres.

DETAILED DESCRIPTION OF THE INVENTION

In general, the present invention is for a grating light valve capable of alternating between constructive and destructive interference conditions with an incident light source. The grating light valve switches between the conditions for constructive and destructive interference through at least one set of movable ribbons. In accordance with the invention, the oscillatory vibrations of the ribbons are reduced by an encapsulated dampening gas environment. Note that the present invention can also be used in conjunction with other types of micro-machines with movable parts that exhibit undesirable oscillations or vibrations during operation.

According to the preferred embodiment of the present invention, movable ribbons of a grating light valve device are encapsulated within a die structure having a substantial concentration of a noble gas. The noble gas provides an environment to dampen the oscillatory vibrations that result when the reflective ribbons move from a destructive interference position to a constructive interference position. The noble gas is He, Ne, Ar, Kr, Xe, Rn or a mixture thereof, that is preferably greater than 50 molar percent of the total dampening gas. The dampening gas is provided such that the total pressure inside the sealed die structure is in the range of 0.5 to 3.0 atmospheres and preferably in the range of 0.5 to 1.5 atmospheres at a temperature of 20±5.0 Celsius. However, higher or lower pressures are also considered to be within the scope of the invention.

Figure 1A:
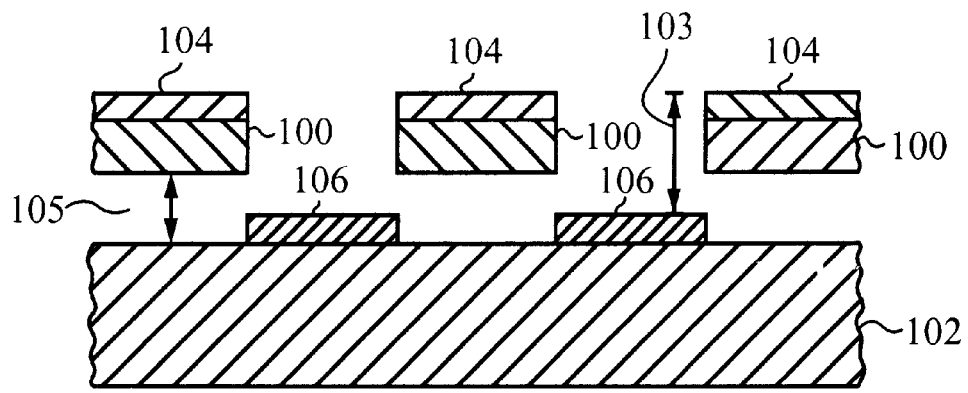
FIG. 1a is a cross-sectional view of a grating light valve with reflective ribbons in a constructive interference position.
Figure 1B:
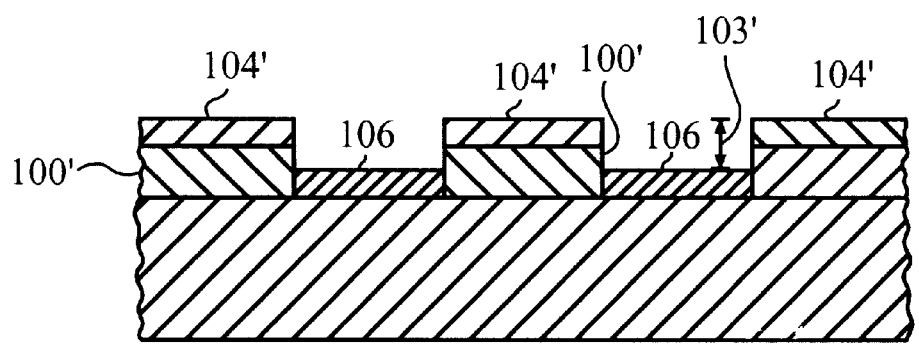
FIG. 1b is a cross-sectional view of the grating light valve, shown in FIG. 1a, with the active ribbons displaced to a destructive interference position.
Figure 2A:
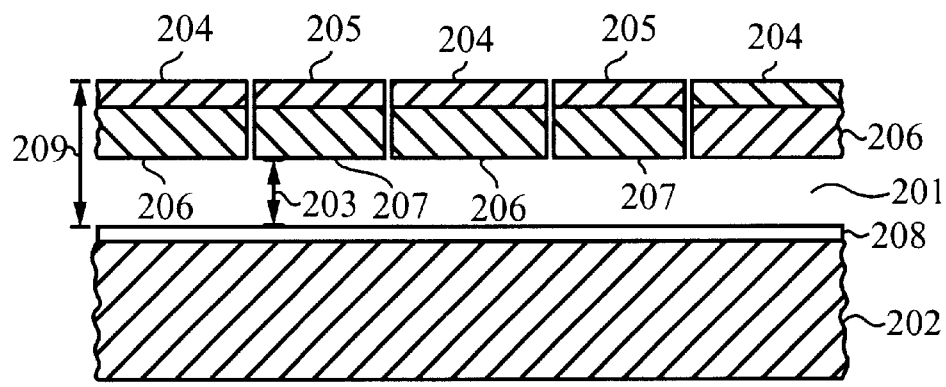
FIG. 2a is a cross sectional view of the grating light valve with set of active ribbons and a set of bias ribbons in the same reflective plane.
Figure 2B:
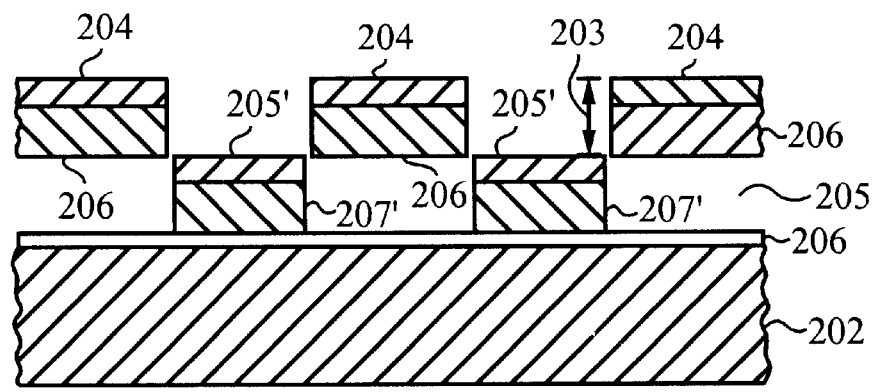
FIG. 2b is a cross sectional view of the grating light in FIG. 2a with the active ribbons displaced from the bias ribbons to a destructive interference position.
Figure 3:
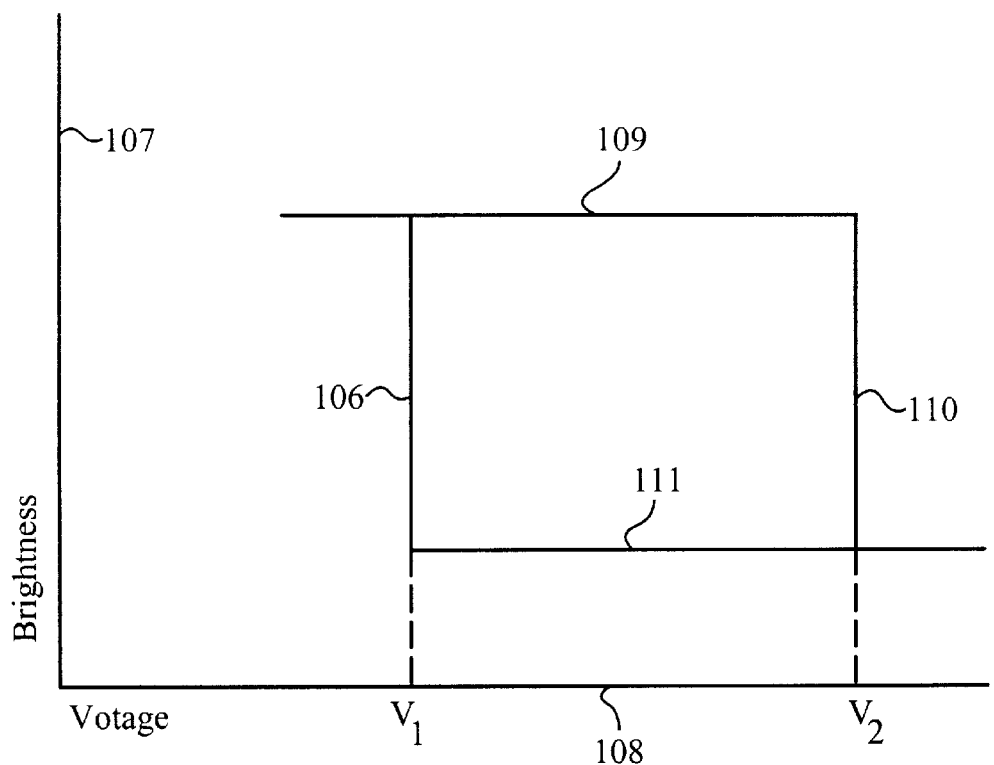
FIG. 3 is a plot of the brightness response versus bias voltage applied to a grating light valve.
Figure 4A:
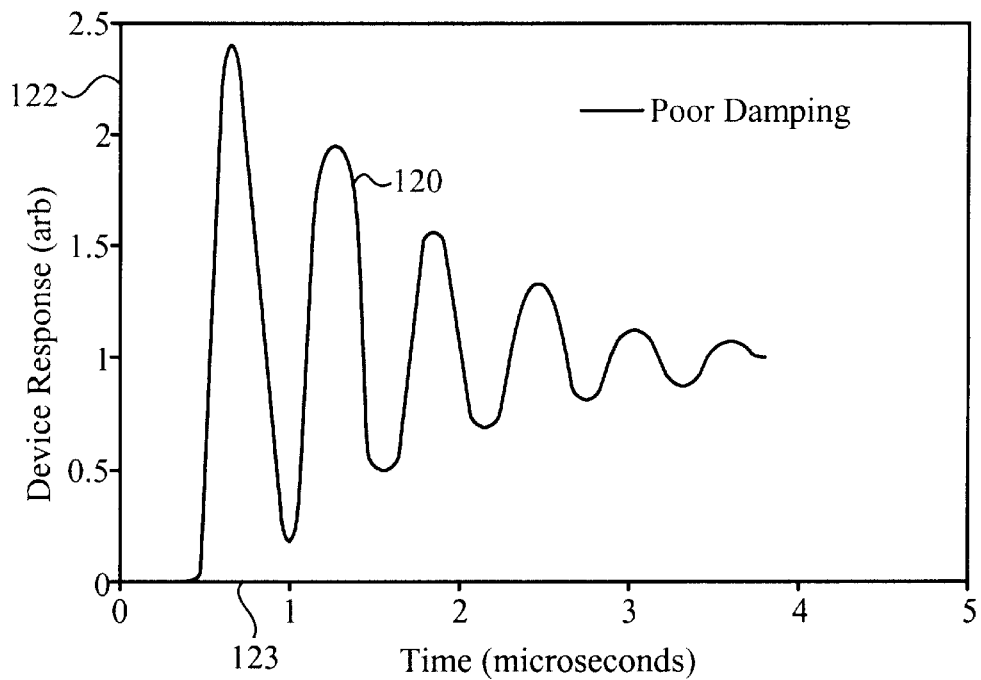
FIG. 4a graphs the oscillatory vibrations of undamped ribbons in a grating light valve.

FIG. 4a plots a response curve 120 for a grating light valve with movable ribbons, as described in detail above. The y-axis 122 is any response, such as the intensity or the brightness of light reflected from the ribbons and the x-axis 123 is time. The curve 120 reveals the effects of the oscillatory vibrations which typically occur in the ribbons of grating light valves when the ribbons are switched from the destructive interference position to the constructive interference position. While the vibrational energy is dissipated through the structure of the device over time, such oscillatory vibrations can persist for periods of time that are on the order of 10 microseconds and can significantly reduce the efficiency and the ability of the device to modulate light, especially at operating wavelengths corresponding to the infrared and the near infrared.

Figure 4B:
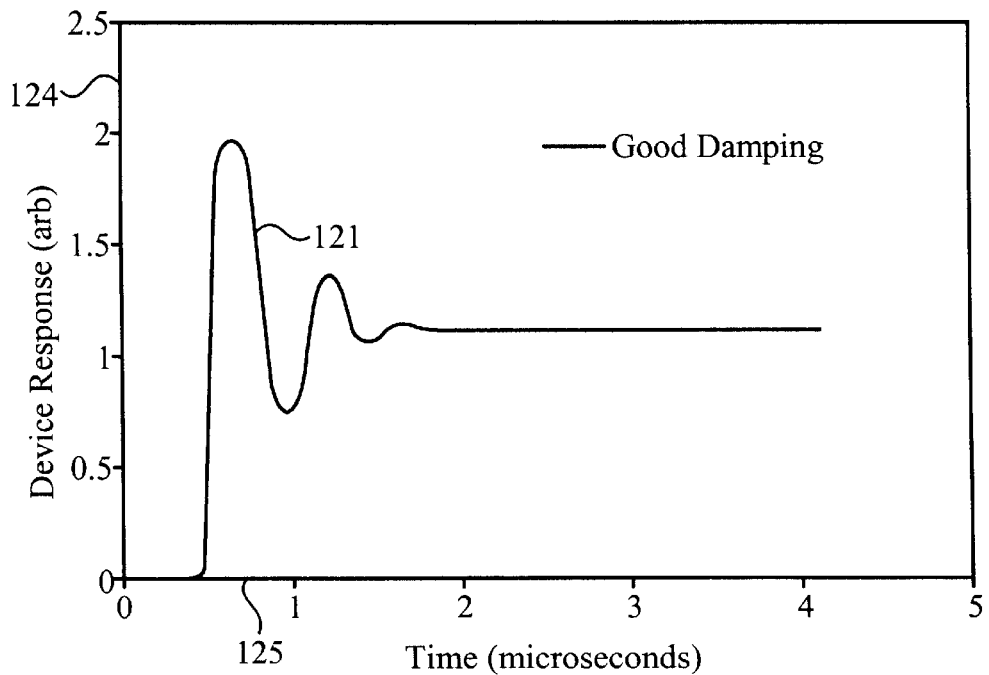
FIG. 4b shows the oscillatory vibrations of dampened ribbons sealed within a dampened gas environment, in accordance with the present invention.

FIG. 4b shows a plot of a response curve 121 for a similar grating light valve with the ribbons and a Neon-based dampening gas environment encapsulated within a die structure. The partial pressure of the Neon in this example is approximately 1.0 atmosphere at 20 Celsius and the dampening gas is approximately 100% Neon. Again the y-axis 124 is any arbitrary response of the ribbons, such as the intensity or brightness of reflected light, and the x-axis 125 is time. It is clear from the plotted response curve 121 that the oscillatory vibrations of the ribbons are dampened by the presence of the Neon-based dampening gas environment. Further, in this example the oscillatory vibrations are barely apparent after about 2.0 microseconds.

Figure 5:
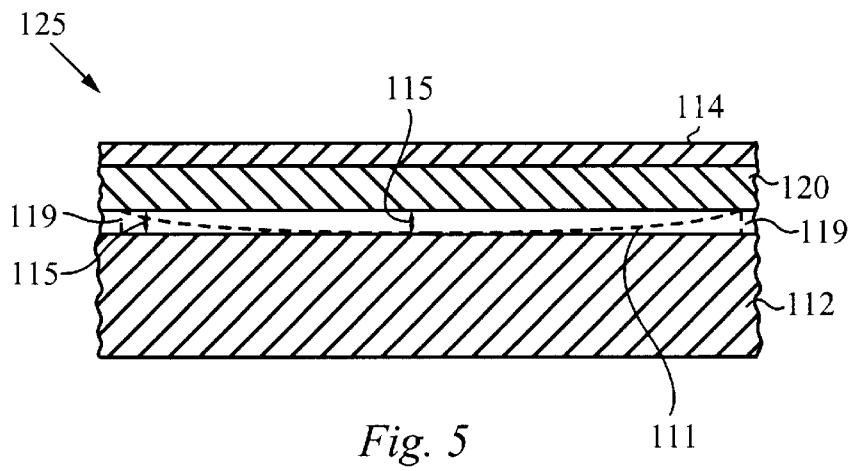
FIG. 5 is cross-sectional view of a single ribbon supported on a substrate element.

FIG. 5 shows a cross-sectional view 125 of a movable ribbon element 120 supported on a substrate element 112. As described previously the ribbon element 120 is provided with a reflective surface 114. The ribbon element 120 is capable of moving up and down between the position shown and the position illustrated by the dotted line 111 when an appropriate bias voltage is applied across the ribbon element 120 and the substrate element 112. Preferably, the spacing 115 is approximately equal to the distance that the ribbon 120 is displaced when alternating between a constructive interference position and a destructive interference position. Alternatively, the spacing 115 is greater than the distance that the ribbon 120 is displaced when alternating between a constructive interference position and a destructive interference position and the ribbon element does not contact the substrate element.

Referring to FIG. 5, both ends of the ribbon are supported by the substrate 112. Therefore, only a central portion of the ribbon 120 will travel the entire distance 115, leaving open spaces 119 near the attached ends of the ribbon 120. However, it will be clear that the ribbon element 120 may be coupled to the substrate element 112 through any number of structural features including a single end of the ribbon 120. Also, it is clear that a plurality of movable ribbons may be couple to a substrate structure with a single support element, such as taught in U.S. Pat. Nos. 5,311,360, 5,841,579 and 5,808,797, the contents of which are hereby incorporated by reference.

Still referring to FIG. 5, when a grating light valve is tailored to operated with light sources corresponding to the infrared and/or the near infrared, then the distance 115 that the ribbons are required to move in order to alternate between the conditions for constructive and destructive interference is greater than 200 nanometers. Ribbons that are deflected to the downward position, as illustrated by the dotted line 111, and towards the substrate to generate the conditions for constructive or for destructive interference, are under considerable stress and tension. Thus the ribbons behave like stiff rubber bands and spring back into the upward position when the appropriate switching voltage is applied causing the oscillating vibrations observed. By providing the appropriate dampening gas, these oscillatory vibrations are considerably reduced even when the distance 115 that the ribbons are moved or displaced is 200 nanometers or greater.

Figure 6:
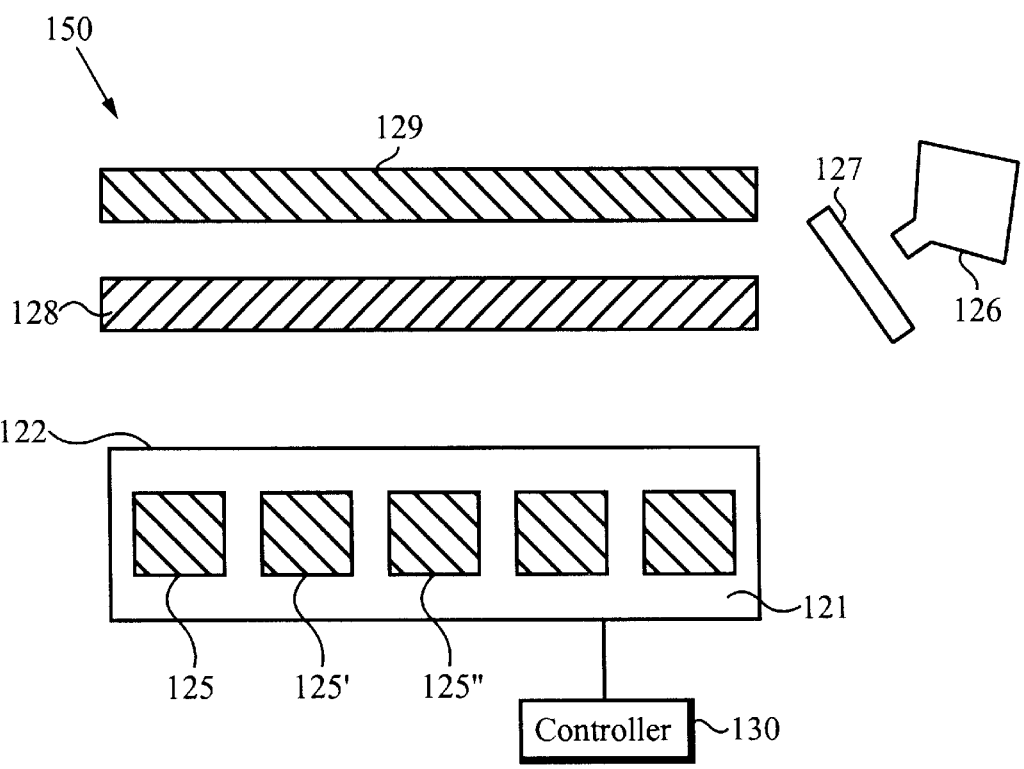
FIG. 6 is a schematic representation of a print system utilizing and an array of grating light valves in accordance with the present invention.

FIG. 6 illustrates a system 150 configured to a print medium 129. The print medium 129 is any suitable medium that is capable of being activated by light reflected from the array of grating light valves 122. The array of grating light valves 122 has a plurality of grating light valves 125, 125' and 125" that are encapsulated within at least one die structure 121 along with a dampening gas environment. The grating light valves 125, 125' and 125" are sealed individually in separate die compartments or collectively in a single die compartment depending on the application and manufacturing process used. The grating light valves 125, 125' and 125" are arranged in a liner array 122 as shown, or alternatively are arranged in a two dimensional and/or three dimensional configuration (not shown). The system 150 is configured with suitable optics 128 between the medium 129 and the array 122. Suitable optics 128 include a filter, a lens, a light activated screen, a photo multiplier screen or any combination thereof, depending on the application at hand. The system also has a light source 126 that provides light with a wavelength λ which the grating light valves 125, 125' and 125" are capable of modulating. The light source 126 is a monochromatic laser source, a broad band light source or multiple wavelength light source. In a further embodiment, there are suitable optics 127 positioned between the light source 126 and the array 122. Suitable optics 127 include a filter, a lens, a light activated screen, a photo multiplier or a combination thereof, depending on the application at hand.

In operation, the light source 126 emits light with a wave length λ. The light is incident on the surface of the array 122. The light is focused, filtered or intensified with the optics 127 to ensure that a portion of light with a wavelength λ strikes the surfaces of the grating light valves 125, 125' and 125". A controller 130 provides an actuating sequence of appropriate switching voltages to each of the individual grating light valves 125, 125' and 125" to alternate the grating light valves 125, 125' and 125" between the conditions for constructive and destructive interference. The portion of the incident light that is reflected by the array 122, in accordance with the actuating sequence, passes through the optics 128 and is focused, filtered or intensified. The reflected light then strikes the print medium 129 to produce the desired image or latent image. Preferably, the system 150 is a scanning print system wherein the array 122 and medium 129 are moved relative to each other while the medium 129 is activated.

Figure 7:
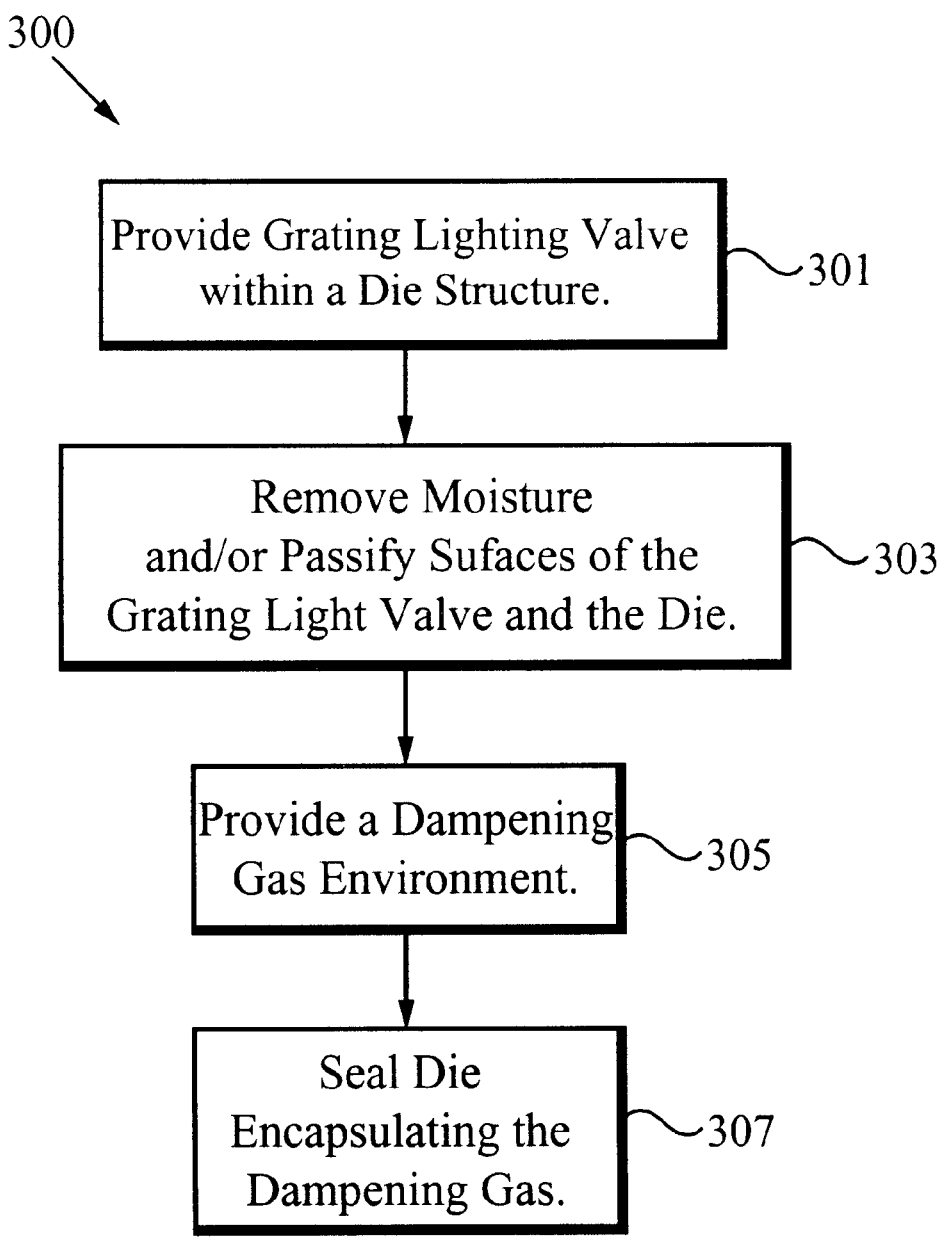
FIG. 7 is a block diagram for the method of making a grating light valve with reflective ribbons sealed within a dampening gas environment in accordance with the present invention.

FIG. 7 shows a block diagram 300 for making a grating light valve or an array of grating light valves are encapsulated within a dampening gas environment. In the step 301, a grating light valve is provided with a die structure. The grating light valve has a plurality of movable reflective ribbons as described previously. The die structure is monolithic with the ribbons formed during the production of the grating light valve or is provided separately. For descriptive purpose below, the die structure and the grating light valve are treated as separate entities.

In step 303, moisture is removed from the surfaces of the grating light valve and the die structure. Preferably, moisture is removed form the surfaces by heating the grating light valve. After removing moisture in step 303, in step 305 a dampening gas environment is provided. After the dampening gas environment is provided in step 305, then in step 307 the die structure is sealed, thus encapsulating the ribbons and the dampening gas environment.

Figure 8:
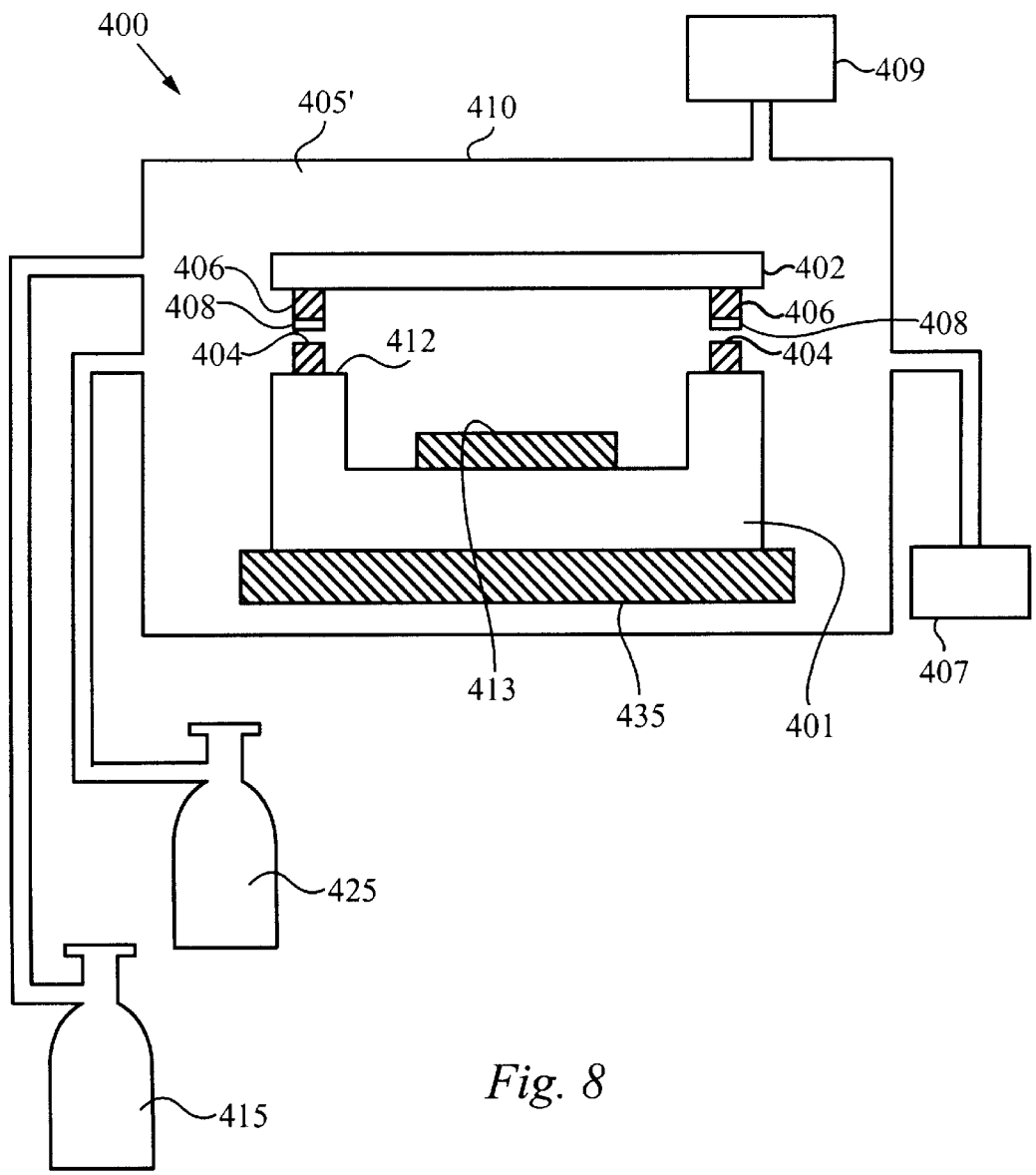
FIG. 8 is a schematic representation of a isolation chamber used in the preferred method of the instant invention.
Figure 9:
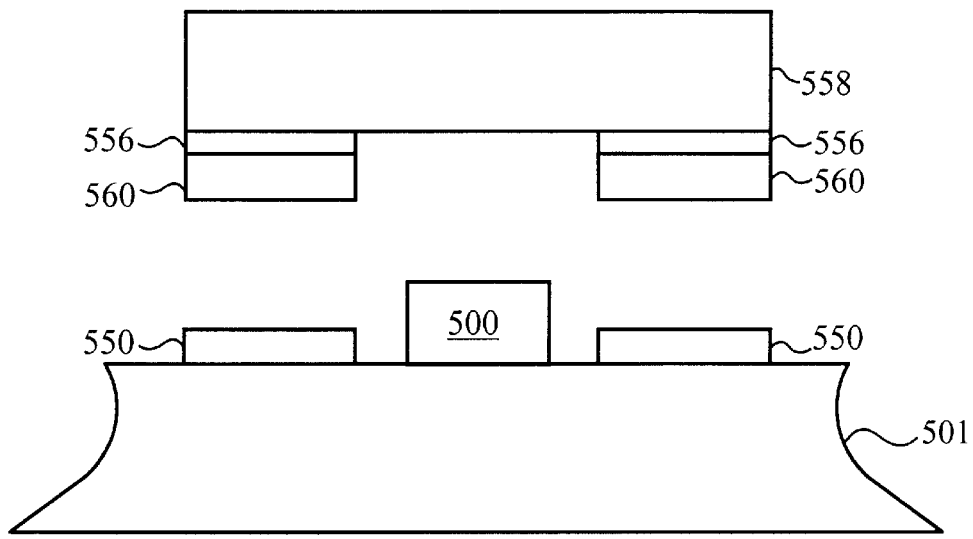
FIGS. 9a–b show a schematic view of a grating light valve with a lid and a die structure with metallized gaskets and a solder material between for providing a hermetic seal, in accordance with a preferred embodiment of the invention.
Figure 10:
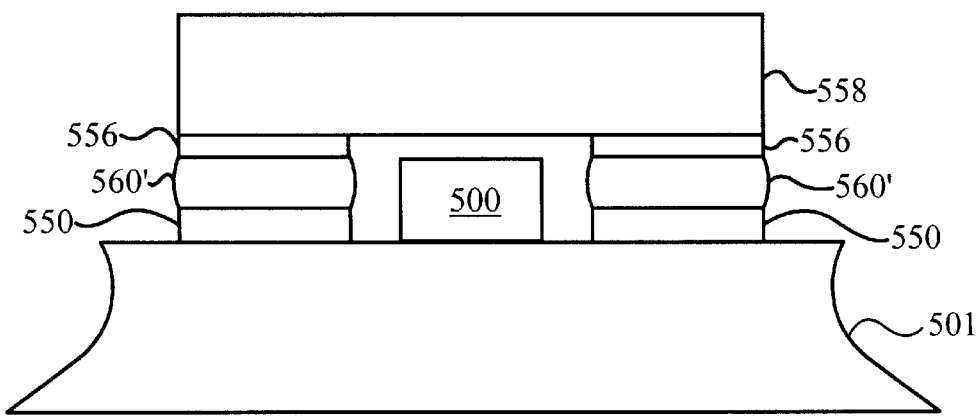

FIG. 8 illustrates an apparatus 400 configured for use in the preferred method of the instant invention. A grating light valve 413 is provided within a die structure 401 and both are placed within a isolation chamber 410. Dampening gas is sealed within the die structure 401 by providing a suitable dampening gas environment 405' in the isolation chamber 410 and sealing a portion of the dampening gas environment 405' within the die structure 401. The pressure and/or flow of the dampening gas environment 405' within the isolation chamber 410 can be controlled with a vacuum source 407 coupled to the isolation chamber 410.

Still referring to FIG. 8, the dampening gas environment 405' is preferably encapsulated within the die structure 401 by providing a preformed metallized gasket 404 on the sealing edge 412 of the die structure 401. A glass cap 402 is also provided. The glass cap 402 has a complementary preformed metallized gasket 406. The glass cap 402 is placed on the die structure 401 with the gaskets 404 and 406 aligned and overlapping and with a solder material 408 between the gaskets 404 and 406.

The gas source 425 and 415 comprise at least one noble group VIII gas 425 that preferably provides 50 molar percent or more of total dampening gas environment 405'. Dampening effects have been observed using a Neon and Krypton dampening gas environment that is approximately 100% Neon or Krypton with trace amounts of impurity gases. Alternatively, the dampening gas environment 405' contains a second gas 415, such as Nitrogen, Hydrogen, a second noble group VIII gas or any combination thereof.

Prior to sealing the die structure 401, the pressure of the dampening gas environment 405' is adjusted until the pressure meter 409 reads a value between 1.0 and 6.0 atmospheres. Then the temperature of the die structure 401 and the cap 402 are adjusted with a heating element 435 to a sealing temperature of approximately 300 degrees Celsius ±50, depending on the solder material materials 408 that are used. Preferably, the sealing temperature does not exceed 400 degrees Celsius, because higher temperatures can reduce the reflectivity of the ribbon surfaces. The sealing temperature is maintained for approximately 10 minutes or a sufficient time to thereby cause the solder material 405 to melt and thereby solder the glass cap 402 to the die structure 401 through the gaskets 404 and 406 and encapsulate a portion of the dampening gas environment 405. The sealed die structure is then cooled and removed from the isolation chamber 410 to be installed and used in the desired device.

The present invention has been described relative to a preferred embodiment. Improvements or modifications that become apparent to persons of ordinary skill in the art only after reading this disclosure are deemed within the spirit and scope of the invention. Specifically, the operation of a grating light device has been described using a single set of movable ribbons which are alternating with respect to a set of stationary ribbons. However, it is understood that the conditions for constructive and destructive interference can be achieved by moving either set of ribbons or both sets of ribbons. Further, it is understood that practicing the instant invention is not dependent on a particular grating light valve construction or device.

The present invention has been described relative to a preferred embodiment. Improvements or modifications that become apparent to persons of ordinary skill in the art only after reading this disclosure are deemed within the spirit and scope of the application. Specifically, the operation of a grating light device has been described using a single set of movable ribbons which are alternating with respect to a set of stationary ribbons. However, it is understood that the conditions for constructive and destructive interference can be achieved by moving either set of ribbons or both sets of ribbons. Further, it is understood that practicing the instant invention is not dependent on a particular grating light valve construction or device.

What is claimed is:

1. An apparatus comprising a grating light valve for modulating a light source having wavelength $\lambda$, wherein the grating light valve is encapsulated with a dampening gas environment and comprises a plurality of spatially arranged movable ribbons with reflective top surfaces and reflective substrate surfaces and wherein the dampening gas environment comprising a noble group VIII element for reducing oscillatory vibrations of the movable ribbons as the movable ribbons are switched between the conditions for constructive and destructive interference.

2. The apparatus of claim 1, further comprising a die structure for encapsulating the grating light valve within the dampening gas environment.

3. The apparatus of claim 1, wherein the dampening gas environment comprises Krypton gas with a partial pressure in a range of 50 to 100% of the total pressure of the dampening gas environment.

4. The apparatus of claim 1, wherein the dampening gas environment comprises Neon gas with a partial pressure in a range of 50 to 100% of the total pressure of the dampening gas environment.

5. The apparatus of claim 4, wherein the dampening gas environment further comprises an inert gas selected from a group consisting of He, Ar, Kr, Xe and Rn.

6. The apparatus of claim 1, wherein the movable ribbons are displaced by $\lambda/4$ to alternate between the conditions for constructive and destructive interference.

7. The apparatus of claim 6, wherein $\lambda$ is between 800 and 4000 nanometers.

8. The apparatus of claim 1, wherein the grating light valve is configured to modulate the light source to activate a print medium.

9. The apparatus of claim 8, further comprising a lens for focusing the modulated light from the grating light valve to the print medium.

10. The apparatus of claim 1, further comprising a lens for focusing the incident light source on to the grating light valve.

11. A system comprising an array of grating light valves encapsulated within a dampening gas environment comprising Neon or Krypton gas with a partial pressure in a range 0.5 to 3 atmospheres at 20 degrees Celsius.

12. The system of claim 11, wherein the Neon gas is 50 to 100% of the total dampening gas environment.

13. The system of claim 12, wherein the dampening gas environment further comprises a gas selected from a group consisting of He, Ar, Kr, Xe and Rn.

14. The system of claim 11, wherein the array of grating light valves is configured to modulate an incident light source with a wavelength $\lambda$ between 800 and 4000 nanometers.

15. The system of claim 14, wherein a plurality of grating light valves within the array of grating light valves each comprises a plurality of spatially arranged elongated ribbon elements with reflective top surfaces and reflective substrate surfaces, wherein a portion of the elongated ribbon elements in each of the plurality of grating light valves are capable of being moved by a predetermined distance to interfere constructively and destructively with the incident light source.

16. The system of claim 11, where in the array of grating light valves is configured to activate a printing medium.

17. A method for making a grating light valve comprising the step of:
   a. providing a die structure containing a grating light valve structure;
   b. bathing the grating light valve structure with a Neon-based dampening gas; and
   c. sealing the die with the grating light valve structure and the dampening gas contained within the die.

18. The method of claim 17, wherein the temperature of the grating light valve is adjusted to a temperature in a range of 100 to 300 Celsius prior to the step of sealing the die.

19. The method of claim 17, wherein the step of bathing the grating light valve with Neon-based dampening gas and the step of sealing the grating light valve with the dampening gas within the die structure is performed in an isolation chamber.

20. The method of claim 19, wherein pressure of the Neon-based dampening gas is adjusted to pressure greater than 1 atmosphere prior to sealing the die.

21. The method of claim 20, wherein the step of sealing the die comprises the additional steps of:
   a. providing a metallized gasket around a sealing edge of the die structure;
   b. providing a glass cap with a complementary metallized gasket;
   c. placing the glass cap over the die and aligning the metallized gaskets with a solder material between the metallized gaskets; and
   d. adjusting the temperature of the die structure and the glass cap to a temperature sufficient to melt the solder material and seal the glass cap to the die structure.

22. The method of claim 17, wherein dampening gas is equal to or greater than 50% Neon gas.

23. The method of claim 17, wherein dampening gas is equal to or greater than 50% Krypton gas.

24. The method of claim 17, wherein the grating light valve comprises a plurality of elongated ribbon elements and a substrate structure, wherein a portion of the ribbon elements are repeatedly separated by a distance greater than 200 nanometers when a sufficient alternating bias voltage is applied across the portion of the ribbons elements and the substrate structure.

25. An optical MEM device encapsulated within a die with a dampening gas comprising a noble gas environment with a pressure of 0.5 or more at 20 degrees Celsius, the device comprising an array of ribbon elements spatially arranged over a substrate, wherein the ribbons have reflective top surfaces and wherein a portions of the ribbons are configured to move to modulate light reflected from the reflective top surfaces.

* * * * *

UNITED STATES PATENT AND TRADEMARK OFFICE
CERTIFICATE OF CORRECTION

PATENT NO. : 6,646,778 B2
DATED : November 11, 2003
INVENTOR(S) : Gudeman et al.

It is certified that error appears in the above-identified patent and that said Letters Patent is hereby corrected as shown below:

Title page, Item [54] and Column 1, lines 1-2,
Title, should read -- OPTICAL MEM DEVICE WITH ENCAPSULATED DAMPENING GAS --.

Title page,
Item [56], References Cited, U.S. PATENT DOCUMENTS, add the following:

| | | | | |
|---|---|---|---|---|
| -- 5,847,859 | 12/08/98 | Murata | 359 | 201 |
| 5,919,548 | 07/06/99 | Barron et al. | 428 | 138 |
| 5,982,553 | 11/09/99 | Bloom et al. | 359 | 627 |
| 6,069,392 | 05/30/00 | Tai et al. | 257 | 419 |
| 6,123,985 | 09/26/00 | Robinson et al. | 427 | 162 |
| 6,172,796 B1 | 01/09/01 | Kowarz et al. | 359 | 290 |
| 6,215,579 B1 | 04/10/01 | Bloom et al. | 359 | 298 |
| 6,268,952 B1 | 07/31/01 | Godil et al. | 359 | 291 |
| 6,445,502 B1 | 09/03/02 | Islam et al. | 359 | 571 --. |

Column 9,
Lines 19-31, delete the entire paragraph.

Signed and Sealed this

Ninth Day of March, 2004

JON W. DUDAS
*Acting Director of the United States Patent and Trademark Office*